United States Patent
Jung et al.

(10) Patent No.: US 7,401,100 B2
(45) Date of Patent: Jul. 15, 2008

(54) METHOD OF AND APPARATUS FOR SYNCHRONIZING INTERACTIVE CONTENTS

(75) Inventors: Kil-soo Jung, Gyeonggi-do (KR); Hyun-kwon Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 484 days.

(21) Appl. No.: 10/798,272

(22) Filed: Mar. 12, 2004

(65) Prior Publication Data

US 2004/0255235 A1  Dec. 16, 2004

(30) Foreign Application Priority Data

Mar. 13, 2003  (KR) ............... 10-2003-0015693

(51) Int. Cl.
  *G06F 17/30*  (2006.01)
(52) U.S. Cl. .............. 707/104.1; 719/328; 715/719
(58) Field of Classification Search ............. 707/104.1, 707/2, 10; 719/328; 709/203; 715/719
  See application file for complete search history.

(56) References Cited

U.S. PATENT DOCUMENTS 5,748,187 A * 5/1998 Kim et al. ............... 715/500.1
6,243,772 B1 * 6/2001 Ghori et al. .............. 710/68
6,282,714 B1 * 8/2001 Ghori et al. .............. 725/81
6,631,403 B1 * 10/2003 Deutsch et al. .......... 709/217
2002/0157095 A1 * 10/2002 Masumitsu et al. ....... 725/46

FOREIGN PATENT DOCUMENTS

| KR | 2002-65039 A | 8/2002 |
|---|---|---|
| WO | WO 97/32437 | 4/1997 |
| WO | WO 00/54277 | 9/2000 |
| WO | WO 00/60598 | 10/2000 |

\* cited by examiner

*Primary Examiner*—Cheryl Lewis
(74) *Attorney, Agent, or Firm*—Stein, McEwen & Bui, LLP

(57) ABSTRACT

A method of and apparatus for synchronizing interactive contents. The apparatus includes a synchronized multimedia element determining unit and an application program interface (API). The synchronized multimedia element determining unit determines whether multimedia elements included in the interactive contents are synchronized with audio video (AV) contents. The API transmitting unit transmits an API corresponding to an interactive control command to an AV contents reproducing engine that reproduces the AV contents and a synchronized multimedia element reproducing engine that reproduces multimedia elements that are determined by the synchronized multimedia element determining unit to be synchronized with the AV contents.

16 Claims, 9 Drawing Sheets

FIG. 3

```
<html>
    <head>
        <meta name="synchronization_id" contents="2" />
    </head>
    <body onload="dvdvideo.play();">
        <table border="0" width="720" height="480">
            <tr>
                <td width="277" height="184" align="left" valign="top">
                    <object data="dvd:" width="277" height="184" border="0"/>
                </td>
                <td width="443" height="480" align="left" valign="top" rowspan="2">
                    <object id="1" data="ani1.swf" type="application/x-shockwave-flash" />
                </td>
            </tr>
            <tr>
                <td width="277" height="296">
                    <object id="2" data="ani2.swf" type="application/x-shockwave-flash" />
                </td>
            </tr>
        </table>
    </body>
</html>
```

FIG. 4

```
<html>
    <body onload="dvdvideo.play();">
        <table border="0" width="720" height="480">
            <tr>
                <td width="277" height="184" align="left" valign="top">
                    <object data="dvd:" width="277" height="184" border="0"/>
                </td>
                <td width="443" height="480" align="left" valign="top" rowspan="2">
                    <object data="ani1.swf" type="application/x-shockwave-flash"
                        synchronization="false" />
                </td>
            </tr>
            <tr>
                <td width="277" height="296">
                    <object data="ani2.swf" type="application/x-shockwave-flash"
                        synchronization="true" />
                </td>
            </tr>
        </table>
    </body>
</html>
```

FIG. 5

```
interface RCKeyEvent : UIEvent        {
    public const unsigned short VK_0          = 0;  // keyCode is "0", keyName is "0"
    public const unsigned short VK_1          = 1;  // "1"
    public const unsigned short VK_2          = 2;  // "2"
    public const unsigned short VK_3          = 3;  // "3"
    public const unsigned short VK_4          = 4;  // "4"
    public const unsigned short VK_5          = 5;  // "5"
    public const unsigned short VK_6          = 6;  // "6"
    public const unsigned short VK_7          = 7;  // "7"
    public const unsigned short VK_8          = 8;  // "8"
    public const unsigned short VK_9          = 9;  // "9"
    public const unsigned short VK_A          = 10; // keyCode is "10", keyName is "A"
    public const unsigned short VK_B          = 11; // "B"
    public const unsigned short VK_PLAY_PAUSE = 12; // "PlayPause"
    public const unsigned short VK_STOP       = 13; // "Stop"
    public const unsigned short VK_FF         = 14; // "FastForward"
    public const unsigned short VK_FR         = 15; // "FastRewind"
    public const unsigned short VK_SKIP_PREV  = 16; // "Prev"
    public const unsigned short VK_SKIP_NEXT  = 17; // "Next"
    public const unsigned short VK_SUBTITLE   = 18; // "Subtitle"
    public const unsigned short VK_ANGLE      = 19; // "Angle"
    public const unsigned short VK_AUDIO      = 20; // "Audio"
    public const unsigned short VK_ROOTMENU   = 21; // "RootMenu"
    public const unsigned short VK_TITLEMENU  = 22; // "TitleMenu"
    public const unsigned short VK_UP         = 23; // "Up"
    public const unsigned short VK_LEFT       = 24; // "Left"
    public const unsigned short VK_RIGHT      = 25; // "Right"
    public const unsigned short VK_DOWN       = 26; // "Down"
    public const unsigned short VK_OK         = 27; // "OK"
    public const unsigned short VK_RETURN     = 28; // "Return"
    public const unsigned short VK_EXIT       = 29; // "Exit"
    public const unsigned short VK_CONTENT_INFO  = 30; // "Content"
    public const unsigned short VK_SCREEN_MODE   = 31; // "Screen"
    public const unsigned short VK_FOCUS_CHANGE  = 32; // "FocusChange"
    readonly attribute unsigned short keyCode;
    readonly attribute DOMString keyName;
    void InitRCKeyEvent (in DOMString typeArg,
    in boolean canBubbleArg,
    in boolean cancelableArg,
    in unsigned short keyCode,
    in unsigned short keyName);
}
```

FIG. 6

```html
<html>
    <body onload="dvdVideo.play(); MediaPlayer.Play( );">
        <table border="0" width="720" height="480">
            <tr>
                <td width="277" height="184" align="left" valign="top">
                    <object data="dvd:" width="277" height="184" border="0"/>
                </td>
                <td width="443" height="480" align="left" valign="top" rowspan="2">
                    <object data="anl1.swf" type="application/x-shockwave-flash"
                    synchronization="false" />
                </td>
            </tr>
            <tr>
                <td width="277" height="296">
                    <object data="commentary.wmv" type="video/x-ms-wmv"
                    synchronization="true" />
                </td>
            </tr>
        </table>
    </body>
</html>
```

FIG. 7

| | DVD reproducing engine | Window media player | flash player |
|---|---|---|---|
| Play | dvdVideo.InputRCKey(12) | MediaPlayer.Play ( ) | FlashPlayer.Play( ) |
| Pause | dvdVideo.InputRCKey(12) | MediaPlayer.Pause ( ) | FlashPlayer.Pause( ) |
| Stop | dvdVideo.InputRCKey(13) | MediaPlayer.Stop ( ) | FlashPlayer.Stop( ) |
| Prev | dvdVideo.InputRCKey(16) | MediaPlayer.Previous ( ) | FlashPlayer.Prev( ) |
| Next | dvdVideo.InputRCKey(17) | MediaPlayer.Next ( ) | FlashPlayer.Next( ) |

METHOD OF AND APPARATUS FOR SYNCHRONIZING INTERACTIVE CONTENTS

CROSS-REFERENCE TO RELATED APPLICATIONS

This application claims the priority of Korean Patent Application No. 2003-15693, filed on Mar. 13, 2003, in the Korean Intellectual Property Office, the disclosure of which is incorporated herein in its entirety by reference.

BACKGROUND OF THE INVENTION

1. Field of the Invention

The present invention relates to a method of and apparatus for synchronizing interactive contents, and more particularly, to a method of and apparatus for synchronizing and reproducing interactive contents.

2. Description of the Related Art

At present, Internet-based markup languages allow users to handle various texts and multimedia elements and to construct web pages more dynamically and colorfully than before. Recently, it has become possible to reproduce specific audio visual (AV) contents such as digital versatile disk (DVD) contents simultaneously with a variety of multimedia elements. The widely used Hyper Text Markup Language (HTML) makes it possible to produce a markup document using defined tags and attributes to reproduce AV contents and multimedia elements within the markup document, but there is no method to reproduce specific multimedia elements in synchronization with the AV contents. According to related arts, by using an Extensible Markup Language (XML) such as the Synchronized Multimedia Integration Language (SMIL) and time attributes, the starting and ending points and the duration of time of reproduction of multimedia elements included in a browser can be handled as tags and attributes. However, a technique of controlling navigation by synchronizing reproduced contents is not available. Also, to control each element for the purpose of implementing such synchronization, numerous tags and attributes are needed, thereby complicating markup document production.

SUMMARY OF THE INVENTION

The present invention provides a method of and apparatus for synchronizing and reproducing various multimedia elements effectively, in which specific AV contents, such as digital versatile disk (DVD) contents, and multimedia elements that are synchronized with the specific AV contents are simultaneously navigated in response to user input by including in AV/interactive contents information about the multimedia elements regarding whether the multimedia elements are synchronized with the AV contents.

According to one aspect of the present invention, there is provided an apparatus for synchronizing interactive contents. The apparatus includes a synchronized multimedia element determining unit, which determines whether multimedia elements included in the interactive contents are synchronized with audio visual (AV) contents, and an application program interface (API) transmitting unit, which transmits an API corresponding to an interactive control command to an AV contents reproducing engine that reproduces the AV contents and a synchronized multimedia element reproducing engine that reproduces multimedia elements that are determined to be synchronized with the AV contents by the synchronized multimedia element determining unit.

According to another aspect of the present invention, there is provided an apparatus for synchronizing and reproducing interactive contents. The apparatus includes an interactive contents synchronizing unit, which determines whether multimedia elements included in the interactive contents are synchronized with audio visual (AV) contents and transmits an application program interface (API) corresponding to an interactive control command, an AV contents reproducing engine, which receives the API transmitted from the interactive contents synchronizing unit and reproduces the AV contents according to the received API, and a synchronized multimedia element reproducing engine, which receives the API transmitted from the interactive contents synchronizing unit and reproduces multimedia elements that are determined by the interactive contents synchronizing unit to be synchronized with the AV contents.

According to still another aspect of the present invention, there is provided a method of synchronizing interactive contents including determining whether multimedia elements included in the interactive contents are synchronized with audio visual (AV) contents and transmitting an application program interface (API) corresponding to an interactive control command to an AV contents reproducing engine that reproduces the AV contents and a synchronized multimedia element reproducing engine that reproduces multimedia elements that are determined to be synchronized with the AV contents.

According to yet another aspect of the present invention, there is a method of synchronizing and reproducing interactive contents including determining whether multimedia elements included in the interactive contents are synchronized with audio visual (AV) contents and transmitting an application program interface (API) corresponding to an interactive control command, receiving the API and reproducing the AV contents according to the received API, and reproducing multimedia elements that are determined to be synchronized with the AV contents.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings in which:

FIG. 3 illustrates an exemplary markup document that expresses interactive contents, according to the present invention;

FIG. 4 illustrates an exemplary markup document that expresses interactive contents, according to the present invention;

FIG. 5 illustrates an application program interface (API) corresponding to an interactive control command, according to the present invention;

FIG. 6 illustrates an exemplary markup document that expresses interactive contents, according to the present invention;

FIG. 7 illustrates a control command with respect to an AV contents reproducing engine and a plug-in player, according to the present invention;

DETAILED DESCRIPTION OF THE EMBODIMENTS

Figure 1:
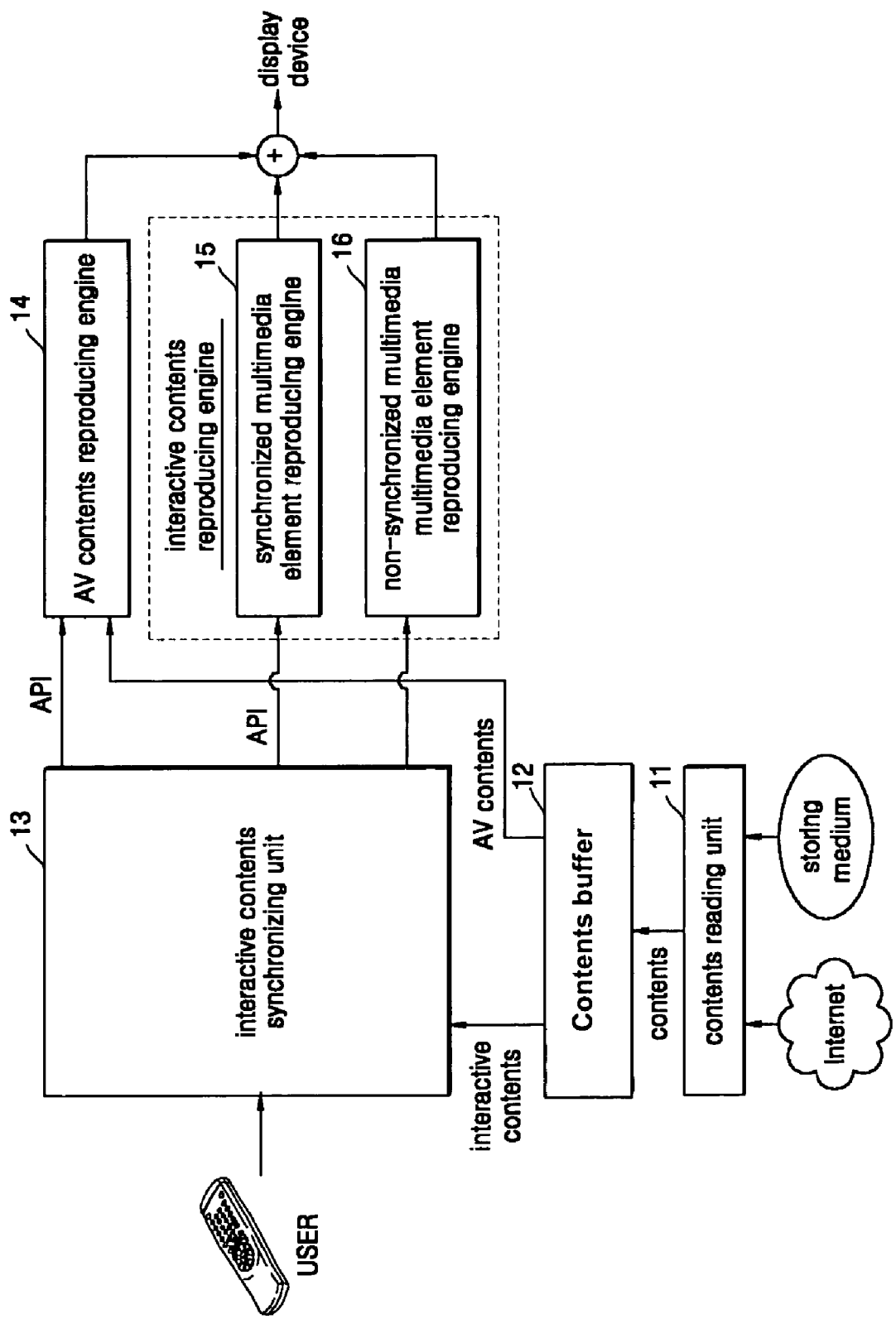
FIG. 1 is a diagram of an apparatus for synchronizing and reproducing interactive contents, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a diagram of an apparatus for synchronizing and reproducing interactive contents, according to an embodiment of the present invention.

The apparatus for synchronizing and reproducing interactive contents includes a contents reading unit 11, a contents buffer 12, an interactive contents synchronizing unit 13, an AV contents reproducing engine 14, a synchronized multimedia element reproducing engine 15, and a non-synchronized multimedia element reproducing engine 16.

The contents reading unit 11 reads AV/interactive contents including AV contents and interactive contents from a storage medium such as a DVD read only memory (DVD-ROM) or a compact disk ROM (CD-ROM) or reads the AV/interactive contents by downloading them from the Internet. The contents buffer 12 buffers the AV/interactive contents read by the contents reading unit 11. The contents buffer 12 is required for stable reproduction of the AV/interactive contents and may not be required in an ideal environment where reading speeds are very high.

The interactive contents synchronizing unit 13 parses the interactive contents included in the AV/interactive contents buffered by the contents buffer 12. At this time, the interactive contents including information that controls the reproduction of the AV contents and multimedia elements included in the AV/interactive contents that are previously read from the contents buffer 12 are then parsed. In the ideal environment, the interactive contents included in the AV/interactive contents read by the contents reading unit 11 can be directly parsed. In general, the interactive contents denote contents that allow users to control DVD images in an interactive manner and are mainly based on the Enhanced Navigation (ENAV) suggested in the DVD Forum (http://www.dvdforum.org).

The interactive contents synchronizing unit 13 interprets the interactive contents included in the parsed AV/interactive contents, determines whether the multimedia elements included in the AV/interactive contents are synchronized with the AV contents, receives an interactive control command from a user, and transmits an application program interface (API) corresponding to the received interactive control command to the AV contents reproducing engine 14 and the synchronized multimedia element reproducing engine 15. Here, the AV contents are basic contents for synchronization and other contents are synchronized with these AV contents. The AV contents that are basic contents for synchronization are generally DVD contents. Determining which multimedia elements should be synchronized with the AV contents is accomplished by interpreting the interactive contents. Thus, such synchronized multimedia elements can be controlled independently of other multimedia elements. In other words, a corresponding API is transmitted to the AV contents reproducing engine 14, which reproduces the AV contents, and the synchronized multimedia element reproducing engine 15, which reproduces the multimedia elements that are determined to be synchronized with the AV contents. Here, the API denotes a method predetermined by operating systems or other application programs to request operations of the operating systems or other application programs. The API is implemented by calling a function that provides a connection to a specific subroutine in a program.

The AV contents reproducing engine 14 receives the API transmitted from the interactive contents synchronizing unit 13 and reproduces the AV contents according to the received API. The synchronized multimedia element reproducing engine 15 receives the API transmitted from the interactive contents synchronizing unit 13 and reproduces the multimedia elements that are determined by the interactive contents synchronizing unit 13 to be synchronized with the AV contents according to the received API. If a user inputs the interactive control command such as reproduction or stop by pressing a specific key on a remote controller, the interactive contents synchronizing unit 13 receives the interactive control command and transmits the API corresponding to the received interactive control command to the AV contents reproducing engine 14 and the synchronized multimedia element reproducing engine 15. Then, the AV contents reproducing engine 14 and the synchronized multimedia element reproducing engine 15 receive the transmitted API and reproduce the AV contents and the multimedia elements according to the received API, respectively. In this way, the AV contents and the multimedia elements are reproduced while being synchronized with each other, according to the intention of a manufacturer of the AV/interactive contents.

The non-synchronized multimedia element reproducing engine 16 reproduces the multimedia elements that are determined by the interactive contents synchronizing unit 13 not to be synchronized with the AV contents. The multimedia elements such as banner advertisements, which are reproduced asynchronously with the AV contents may be reproduced repeatedly and continuously.

The synchronized multimedia element reproducing engine 15 and the non-synchronized multimedia element reproducing engine 16 are included in an interactive contents reproducing engine. Also, a reproducing engine for still image browsers is also included in the interactive contents reproducing engine. Thus, AV images (generally DVD images) that are implemented by the AV contents, browsers that are implemented by the interactive contents, and the multimedia elements are mixed and then displayed on a single screen of a display device.

Figure 2:
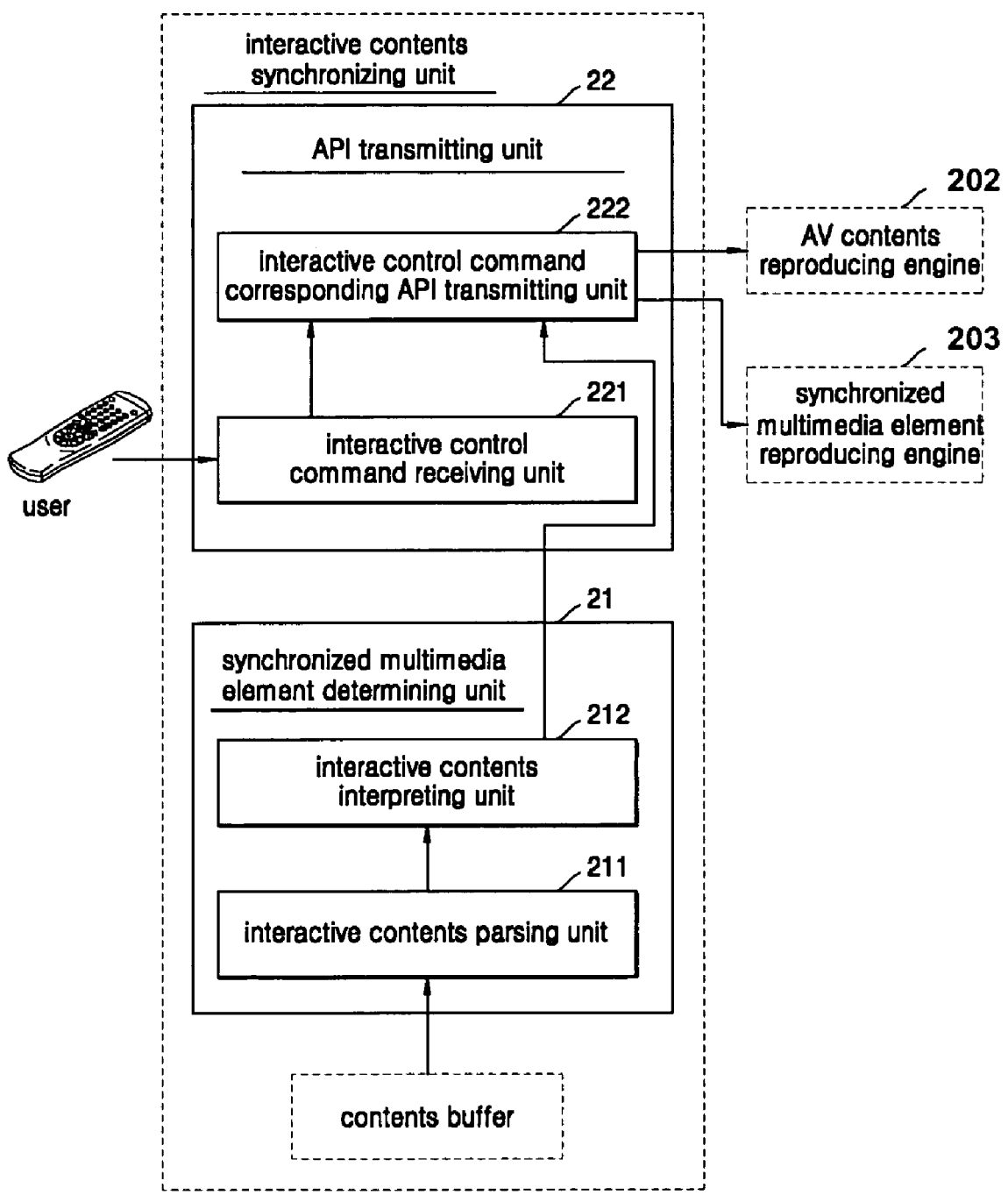
FIG. 2 illustrates the configuration of an apparatus for synchronizing interactive contents, according to an embodiment of the present invention.

FIG. 2 illustrate the configuration of an apparatus for synchronizing interactive contents, according to an embodiment of the present invention.

The apparatus for synchronizing interactive contents includes a synchronized multimedia element determining unit 21 and an API transmitting unit 22.

The synchronized multimedia element determining unit 21 parses and interprets the interactive contents including the AV contents and the multimedia elements and determines whether the multimedia elements included in the interactive contents are synchronized with the AV contents. Here, the AV contents are generally DVD contents, the interactive contents are expressed by a markup document, and the apparatus for synchronizing the interactive contents is implemented by a browser. The information indicating whether or not the multimedia elements are synchronized with the AV contents may be included in the markup document in forms of meta tags, newly defined tags or attributes, scripts, or binary data.

The synchronized multimedia element determining unit 21 includes an interactive contents parsing unit 211 and an interactive contents interpreting unit 212.

The interactive contents parsing unit 211 parses interactive contents that are expressed by the markup document and creates a document object model (DOM) tree. The DOM tree represents a logical tree-like structure by modeling elements included in a structural document like the markup document as a single object. The interactive contents interpreting unit 212 interprets the DOM tree created by the interactive contents parsing unit 211 and determines whether the elements in each node of the DOM tree are the multimedia elements that are synchronized with the AV contents.

The API transmitting unit 22 receives the interactive control command from a user and transmits the API corresponding to the received interactive control command to an AV contents reproducing engine 202 that reproduces the AV contents and a synchronized multimedia element reproducing engine 203 that reproduces the multimedia elements determined by the synchronized multimedia element determining unit 21 to be synchronized with the AV contents. The interactive control command includes a play command, a stop command, a previous screen view command, and a next screen view command. In general, the interactive control command is input by a user through an input terminal such as a remote controller. The synchronized multimedia element reproducing engine 203 may be implemented by a browser that displays the interactive contents, but is generally implemented by a plug-in player. A plug-in allows files of various formats that cannot be displayed in a browser to be displayed in a window of the browser by using software programmed by a third party. In other words, the plug-in allows files of various formats that are called by the markup document to be opened. Because the plug-in operates within a web browser, the web browser appears to display files that cannot actually be displayed in the web browser without opening a window of the web browser. For example, the plug-in player using the plug-in may be a WINDOWS media player, a flash player, a real player, etc. Because multimedia elements are largely audio files, real moving picture files, and animation moving picture files that are reproduced by WINDOWS media players, flash players, or real players, they can be reproduced using the plug-in player.

More specifically, the API transmitting unit 22 includes an interactive control command receiving unit 221 and an interactive control command corresponding API transmitting unit 222.

The interactive control command receiving unit 221 receives the interactive control command such as a play command, a stop command, a previous screen view command, or a next screen view command. The interactive control command corresponding API transmitting unit 222 transmits the API corresponding to the interactive control command received from the interactive control command receiving unit 221 to the AV contents reproducing engine 202 that reproduces the AV contents and the synchronized multimedia element reproducing engine 203 such as a WINDOWS media player, a flash player, or a real player that reproduces the multimedia elements such as audio files, real moving picture files, and animation moving picture files that are determined by the synchronized multimedia element determining unit 21 to be synchronized with the AV contents.

In other words, the interactive control command corresponding API transmitting unit 222 forms the DOM tree by parsing the interactive contents and thus recognizes the elements in each node of the DOM tree. At this time, the interactive control command corresponding API transmitting unit 222 responds to the interactive control command input by a user through a remote controller. If the elements in each node of the DOM tree can be processed in a browser, the browser displays the elements. If the elements in each node of the DOM tree cannot be processed in the browser, they are displayed using a corresponding plug-in player that allows displaying such elements. Once the user inputs the interactive control command through a specific key input using a remote controller, an event corresponding to the interactive control command occurs. If the corresponding event is intended for a play command, a stop command, a previous screen view command, or a next screen view command, i.e., for navigation, the interactive control command corresponding API transmitting unit 222 transmits the API corresponding to the input event to the AV contents reproducing engine 202 and the synchronized multimedia element reproducing engine 203, i.e., the plug-in player, which reproduces the multimedia elements synchronized with the AV contents. At this time, when the DOM tree is first formed, the API is not transmitted to a plug-in player that reproduces the multimedia elements that are not synchronized with the AV contents, by using recognized synchronization information with the AV contents. Thus, it is possible to reproduce only the multimedia elements which are synchronized with the AV contents, in synchronization with the AV contents.

FIG. 3 illustrates an exemplary markup document that expresses the interactive contents, according to the present invention.

The markup document of FIG. 3 is provided by a manufacturer of AV/interactive contents to allow a browser to recognize whether multimedia elements need to be synchronized with AV contents when the AV/interactive contents include the multimedia elements in addition to the AV contents.

Referring to FIG. 3, the markup document indicates using <object> tags, that two flash animation files are supposed to be reproduced with the AV contents (here, DVD contents). In the first <object> tag, reproduction of the DVD contents is defined. In the second and third <object> tags, reproduction of the flash animation files is defined. The manufacturer uses a <meta> tag to indicate that the multimedia elements included in the markup document need to be synchronized with the DVD contents. Also, the manufacturer defines a "name" attribute of the <meta> tag as "synchronization_id" and a "content" attribute of the <meta> tag as "2". Thus, it can be seen that the flash animation files included by an <object> tag having an attribute "id=2" need to be synchronized with the DVD contents after interpreting the markup document.

Because the DVD contents can be reproduced in the form of video object unit (VOBU), the multimedia elements such as audio files and animation files that are reproduced in synchronization with the DVD contents may additionally need time table information in the form of VOBU. In the present invention, the way in which the multimedia elements are reproduced in synchronization with the DVD contents will not be discussed, as this technique is well known. Thus, the flash animation file included in the second <object> tag is separate from the AV contents and the flash animation file included in the third <object> tag should be reproduced in synchronization with the AV contents. Also, information about a plug-in player that can reproduce corresponding multimedia elements is provided using a "type" attribute.

FIG. 4 illustrates an exemplary markup document that expresses the interactive contents, according to the present invention.

The markup document of FIG. 4 is provided by the manufacturer of the AV/interactive contents to allow a browser to recognize whether multimedia elements need to be synchronized with AV contents when the AV/interactive contents include multimedia elements in addition to the AV contents.

Referring to FIG. 4, similarly to FIG. 3, the markup document indicates using <object> tags that two flash animation files are supposed to be reproduced with the AV contents (here, DVD contents). In the first <object> tag, reproduction of the DVD contents is defined. In the second and third <object> tags, reproduction of the flash animation files are defined. However, in contrast to the mark up document shown in FIG. 3, information about synchronization with the AV contents is not recorded in a specific tag such as a <meta> tag. Instead, a "synchronization" attribute is newly defined in the <object> tags, and thus the DVD contents that need to be synchronized with the AV contents, are recognizable. As shown in FIG. 4, "synchronization" includes a Boolean expression as an attribute value. If the Boolean expression is "true", the flash animation files need to be synchronized with the AV contents. If the Boolean expression is "false", the flash animation files need not to be synchronized with the AV contents. Thus, the flash animation file included in the second <object> tag is separate from the AV contents and the flash animation file included in the third <object> tag needs to be synchronized with the AV contents. Also, information about a plug-in player that can reproduce corresponding multimedia elements is provided using a "type" attribute.

In FIGS. 3 and 4, the information about synchronization with the AV contents is defined in forms of a <meta> tag and attributes, respectively. However, the information about synchronization with the AV contents may be defined in the form of a new tag or a programming language such as Java script. In other words, the information about synchronization with the AV contents can be included in the markup document using various methods. Manufacturers of AV/interactive contents include the information about whether multimedia elements included in their AV/interactive contents need to be synchronized with the AV contents in the markup document. Thus, a browser implemented by the present invention can control the multimedia elements as well as the AV contents by using corresponding information about synchronization with the AV contents in response to user input.

FIG. 5 illustrates the API corresponding to the interactive control command of the present invention.

To respond to a case where a user desires to navigate the AV contents through a user input device such as a remote controller, the API corresponding to the interactive control command should be included. At this time, when the API corresponding to a specific key input event from the remote controller is referred to as an RCKeyEvent interface, the RCKeyEvent interface provides specific information related to the operation of the remote controller. A keycode attribute represents a keycode value that is previously assigned to a key on the remote controller and a keyname represents a name of a key on the remote controller. The RCKeyEvent interface as shown in FIG. 5 is used in the DOM tree.

RCKeyEvents of FIG. 5 may occur by "rckeypress", "rckeydown" or "rckeyup". Among the RCKeyEvents, the minimum keycodes required for navigating the AV contents in the ENAV mode suggested in the DVD Forum (http://www.dvd-forum.org) are "12", "13", "16" and "17". When keys to which "12", "13", "16" and "17" are assigned are pressed in the ENAV mode, a corresponding API is transmitted, and thus the AV contents reproducing engine 14 and the interactive contents reproducing engine shown in FIG. 1 can be controlled. According to the present invention, other multimedia elements that need to be reproduced in synchronization with the AV contents should be controlled, so that the multimedia elements can be navigated in the same way as the AV contents. In other words, a control command corresponding to a navigation event occurring in the user input device should be transmitted to a plug-in player that reproduces each multimedia element as well as the AV contents reproducing engine 14.

Thus, the browser transmits a corresponding API to a plug-in player that reproduces multimedia elements synchronized with the AV contents as well as the AV contents reproducing engine when the user presses keys "PlayPause", "Stop", "Prev", and "Next" to which keycodes "12", "13", "16", and "17" are assigned in the ENAV mode.

FIG. 6 illustrates an exemplary markup document that expresses the interactive contents, according to the present invention.

Referring to FIG. 6, in the markup document, the flash animation file that does not need to be synchronized with the AV contents and a windows media moving picture file that needs to be synchronized with the AV contents are specified as the multimedia elements other than the AV contents. A flash player and a windows media player are specified as a plug-in player that reproduces the flash animation file and the windows media moving picture file.

FIG. 7 illustrates a control command with respect to the AV contents reproducing engine 14 and a plug-in player according to the present invention.

Referring to a table of FIG. 7, if an event corresponding to "Play" is initiated by the user in the ENAV mode, the browser transmits the API named dvdVideo.InputRCKey 12 to the AV contents reproducing engine 14, the window media player specified as MediaPlayer.Play( ), and the flash player specified as FlashPlayer.Play( ). In other words, according to the table of FIG. 7, predetermined corresponding APIs are transmitted to all of reproducing engines and plug-in players that reproduce multimedia elements. However, as mentioned above, because the browser already knows which multimedia elements are synchronized with the AV contents through the information about synchronization with the AV contents, which is included in the markup document, the APIs are not transmitted to the multimedia elements that do not need to be synchronized with the AV contents. Thus, the AV contents and the multimedia elements that need to be synchronized with the AV contents are controlled in the same way in response to a user's navigation event.

Figure 8:
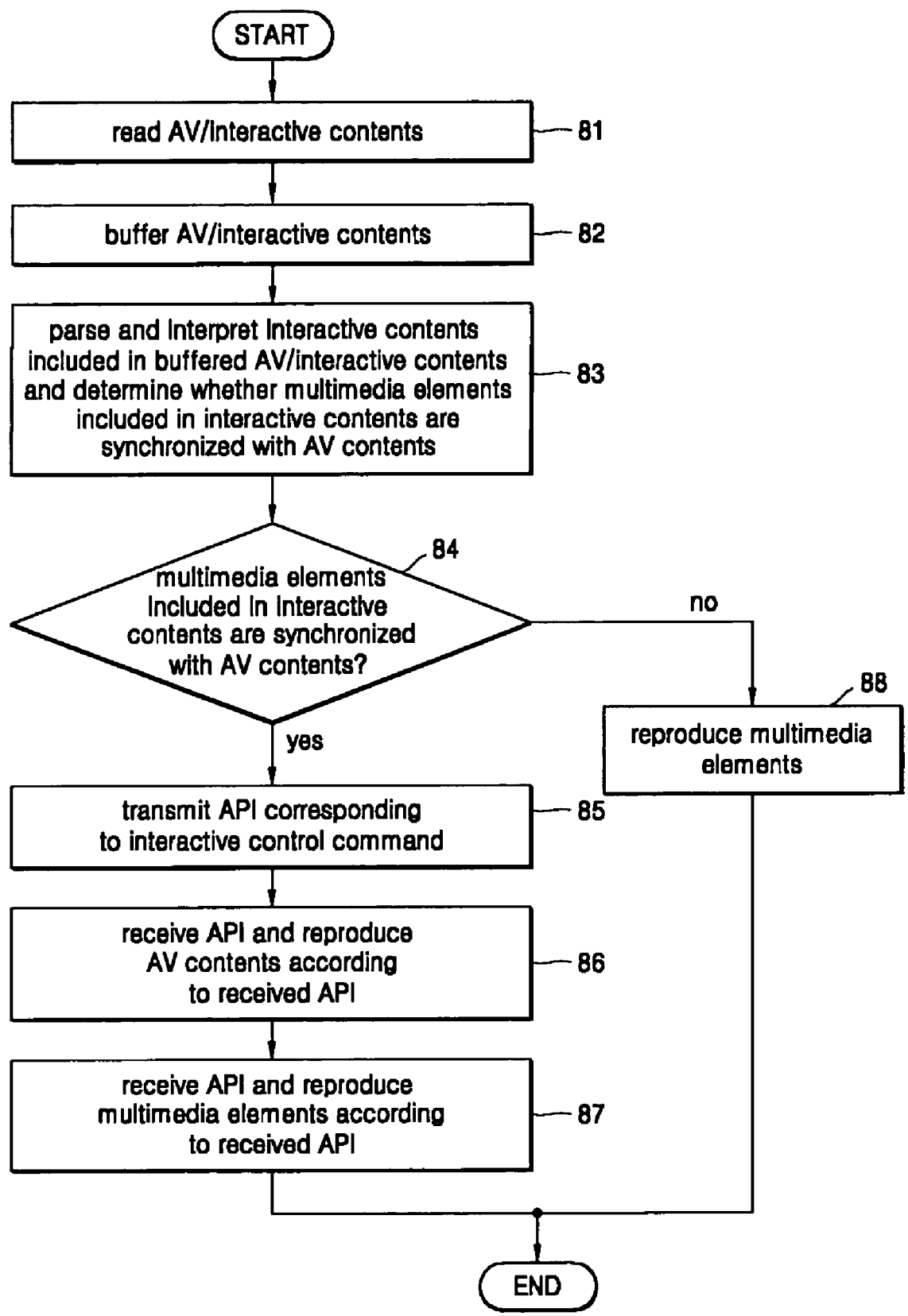
FIG. 8 is a flowchart of a method of synchronizing and reproducing interactive contents, according to another embodiment of the present invention.

FIG. 8 is a flowchart of a method of synchronizing and reproducing interactive contents according to an embodiment of the present invention.

The method of synchronizing and reproducing interactive contents is as follows.

In operation 81, AV/interactive contents including AV contents and interactive contents are read from a predetermined storage medium or are read by downloading from the Internet. In operation 82, the read AV/interactive contents are buffered. In the ideal environment where reading speeds are very high, operation 82 may be omitted. In operation 83, the interactive contents included in the buffered AV/interactive contents are parsed or the interactive contents included in the read AV/interactive contents are directly parsed in the ideal environment, the parsed interactive contents are interpreted, and a determination is made whether multimedia elements included in the interactive contents are synchronized with the AV contents. If the multimedia elements included in the interactive contents are determined to be synchronized with the AV contents in operation 84, an interactive control command is received from a user and an API corresponding to the received interactive control command is transmitted in operation 85. In operation 86, the transmitted API is received and the AV contents are reproduced according to the received API. In operation 87, the transmitted API is received and the multimedia elements that are synchronized with the AV contents are reproduced according the received API. If the multimedia elements included in the interactive contents are determined not to be synchronized with the AV contents in operation 84, the multimedia elements are reproduced independently of the interactive control command.

Figure 9:
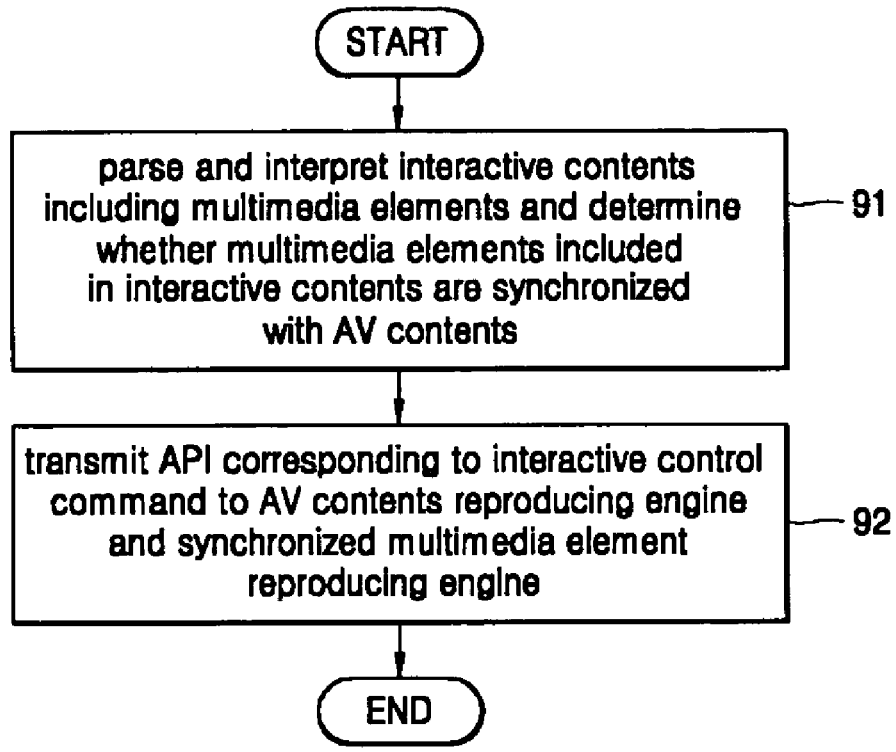
FIG. 9 is a flowchart of a method of synchronizing interactive contents, according to another embodiment of the present invention.

FIG. 9 is a flowchart of a method of synchronizing interactive contents according to an embodiment of the present invention.

The method of synchronizing interactive contents is as follows.

In operation 91, interactive contents including multimedia elements are parsed and interpreted, and a determination is made whether the multimedia elements included in the interactive contents are synchronized with the AV contents. Here, the AV contents are generally DVD contents and the interactive contents are expressed by the markup document. In the markup document, information about whether the multimedia elements are synchronized with the AV contents may be included in forms of <meta> tags, newly defined tags, newly defined attributes, scripts, or binary data.

In operation 92, when an interactive control command is received from a user an API corresponding to the received interactive control command is transmitted to an AV contents reproducing engine 202 that reproduces AV contents and a synchronized multimedia element reproducing engine 203 that reproduces multimedia elements determined to be synchronized with the AV contents as shown in FIG. 2. Here, the interactive control command may be a play command, a stop command, a previous screen view command, or a next screen view command, and the synchronized multimedia element reproducing engine 203 is a plug-in player. The plug-in player may be a windows media player, a flash player, or a real player. Audio files, real moving picture files, and animation moving picture files are the multimedia elements that are reproduced in the windows media player, the flash media player, or the real player, other than the AV contents.

Figure 10:
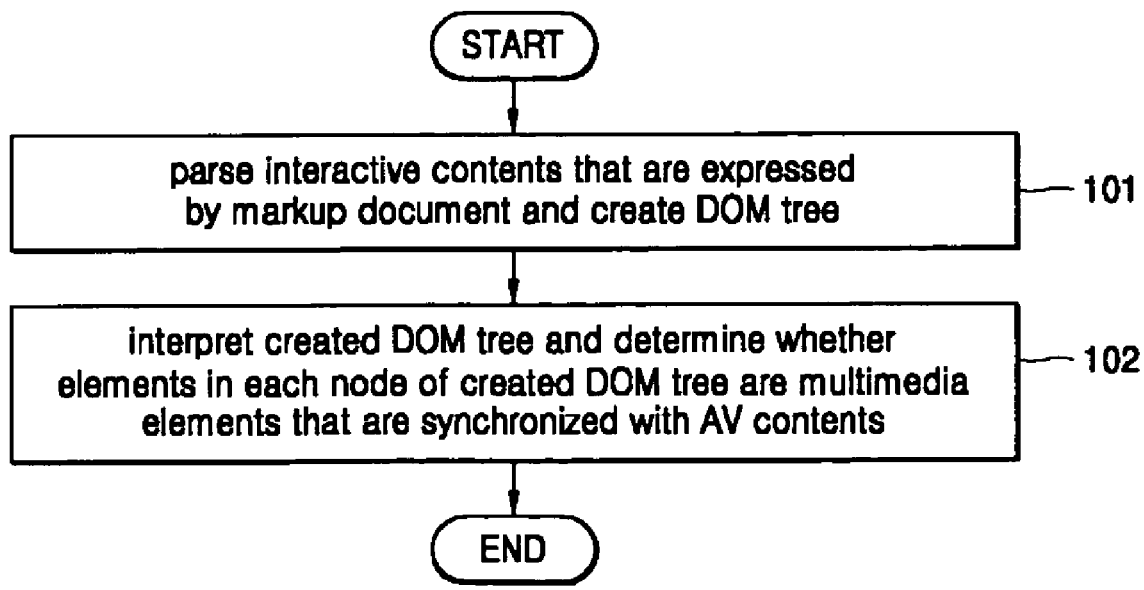
FIG. 10 is a detailed flowchart of operation 91 of FIG. 9.

FIG. 10 is a detailed flowchart of operation 91 of FIG. 9. Operation 91 of FIG. 9 is as follows.

In operation 101, the interactive contents that are expressed by the markup document are parsed and a DOM tree is created. In operation 102, the created DOM tree is interpreted and it is determined whether elements in each node of the created DOM tree are the multimedia elements that are synchronized with the AV contents.

Figure 11:
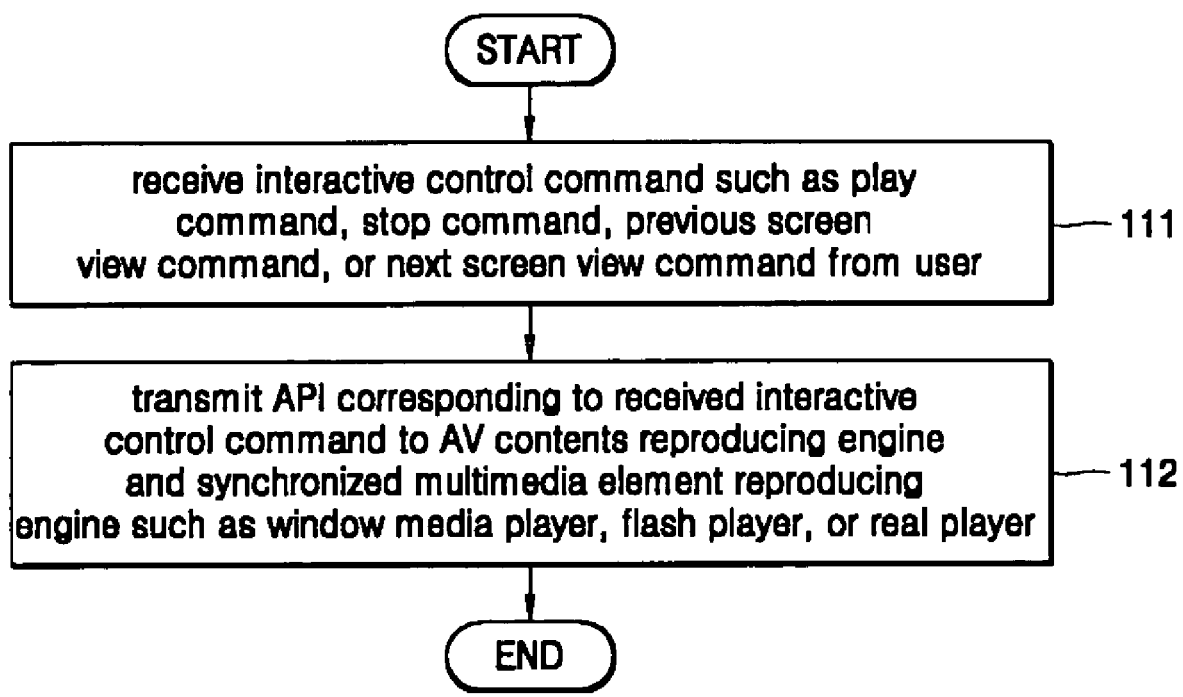
FIG. 11 is a detailed flowchart of operation 92 of FIG. 9.

FIG. 11 is a detailed flowchart of operation 92 of FIG. 9. Operation 92 of FIG. 9 is as follows.

In operation 111, the interactive control command such as a play command, a stop command, a previous screen view command, or a next screen view command is received from a user. In operation 112, an API corresponding to the received interactive control command is transmitted to the AV contents reproducing engine 202 that reproduces the AV contents and the synchronized multimedia element reproducing engine 203 such as the windows media player, the flash player, or the real player that reproduces the multimedia elements such as audio files, real moving picture files, and animation moving picture files that are determined to be synchronized with the AV contents.

The embodiments of the present invention may be embodied as a computer readable code on a computer readable medium and implemented in a general digital computer that executes the program using the computer readable medium.

Data structures used in the embodiments of the present invention can be recorded on the computer readable medium using all kinds of recording devices.

The computer readable medium includes, but not limited to, magnetic storage medium (e.g., ROMs, floppy disks, and hard disks), optical reading media (e.g., CD-ROMs and DVDs), and carrier waves (e.g., transmissions over the Internet).

According to the present invention, specific AV contents, such as DVD contents, and multimedia elements that are synchronized with the specific AV contents are simultaneously navigated in response to user input by including information indicating whether or not the multimedia elements in AV/interactive contents including the multimedia elements are synchronized with the AV contents. Also, it is possible to effectively synchronize and reproduce various multimedia elements. To implement such synchronization, tags or attributes that are defined to include information about synchronization with the AV contents only need to be specified. Thus, the user can conveniently produce markup documents.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A reproducing apparatus for reproducing contents, the reproducing apparatus comprising:
   a storage unit which receives contents including interactive contents and audio visual (AV) contents from a storage medium and/or a distributed network;
   a control unit arranged to control reproduction of the interactive contents and AV contents, via a display device, the control unit comprising:
      a synchronized multimedia element determining unit, which parses and interprets interactive contents including multimedia elements, determines whether multimedia elements included in the interactive contents are synchronized with the AV contents; and
      an application program interface (API) transmitting unit, which transmits an API corresponding to an interactive control command Input from a user to an AV contents reproducing engine that reproduces the AV contents and a synchronized multimedia element reproducing engine that reproduces the multimedia element that are determined to be synchronized with the AV contents by the synchronized multimedia element determining unit, such that the multimedia elements are synchronized and mixed with the AV contents for a visual display on a screen of the display device.

2. The reproducing apparatus of claim 1, wherein the AV contents are digital versatile disk (DVD) contents and the interactive contents are expressed by a markup document and/or are resources referred to in the markup document.

3. The reproducing apparatus of claim 2, wherein the synchronized multimedia element determining unit parses and interprets the interactive contents that are expressed by the markup document including information about whether the multimedia elements are synchronized with the AV contents, and determines whether the multimedia elements included in the interactive contents are synchronized with the AV contents, and wherein the information included in the markup document to indicate whether the multimedia elements are synchronized with the AV contents are in forms of meta tags, newly defined tags, newly defined attributes, scripts, or binary data.

4. The reproducing apparatus of claim 3, wherein the synchronized multimedia element determining unit comprises:
an interactive contents parsing unit which parses the interactive contents that are expressed by the markup document and creates a document object model (DOM) tree; and
an interactive contents interpreting unit which interprets the DOM tree created by the interactive contents parsing unit end determines whether elements in each node of the created DOM tree are the multimedia elements that are synchronized with the AV contents.

5. The reproducing apparatus of claim 1, wherein the interactive control command input from the user represents a play command, a stop command, a previous screen view command, or a next screen view command, and the synchronized multimedia element reproducing engine represents a plug-in player.

6. The reproducing apparatus of claim 5, wherein the plug-in player represents a media player, a flash player, or a real player.

7. The reproducing apparatus of claim 6, wherein the multimedia elements include audio files, real moving picture files, and animation moving picture files that are reproduced in the media player, the flash player or the real player.

8. The reproducing apparatus of claim 7, wherein the API transmitting unit comprises:
an interactive control command receiving unit which receives the interactive control command input from the user that represents the play command, the stop command, the previous screen view command, or the next screen view command; and
an interactive control command corresponding API transmitting unit which transmits the API corresponding to the interactive control command received by the interactive control command receiving unit to the AV contents reproducing engine that reproduces the AV contents and the synchronized multimedia reproducing engine that reproduces the audio files, the real moving picture files, and the animation moving picture files that are determined by the synchronized multimedia element determining unit to be the multimedia elements synchronized with the AV contents.

9. A reproducing apparatus for reproducing interactive contents, the reproducing apparatus comprising:
a contents reading unit which reads AV/interactive contents including audio visual (AV) contents and interactive contents from a storage medium and/or a distributed network; and
a control unit arranged to control reproduction of the interactive contents and AV contents, via a display device, the control unit comprising:
an interactive content synchronizing unit which determines whether multimedia elements included in the interactive contents are synchronized with the AV contents and transmits an application program interface (API) corresponding to an interactive control command;
an AV contents reproducing engine which receives the API transmitted from the interactive contents synchronizing unit and reproduces the AV contents according to the received API; and
a synchronized multimedia element reproducing engine which receives the API transmitted from the interactive contents synchronizing unit and reproduces the multimedia elements that are determined to be synchronized with the AV contents by the interactive contents synchronizing unit, such that the multimedia elements are synchronized and mixed with the AV contents for a visual display on a screen of the display device.

10. The reproducing apparatus of claim 9, wherein the storage medium represents a DVD read-only-memory (DVD-ROM) or a compact disk ROM (CD-ROM), and the distributed network represents the Internet.

11. The reproducing apparatus of claim 10, wherein the interactive contents synchronizing unit parses the interactive content included in the AV/interactive contents read by the contents reading unit.

12. The reproducing apparatus of claim 10, further comprising a contents buffer which buffers the AV/interactive contents read by the contents reading unit.

13. The reproducing apparatus of claim 12, wherein the interactive contents synchronizing unit parses and interprets the interactive content included in the AV/interactive contents buffered by the contents buffer and determines whether the multimedia elements included in the interactive contents are synchronized with the AV contents.

14. The reproducing apparatus of claim 9, further comprising a non-synchronized multimedia element reproducing engine which reproduces the multimedia elements that are determined by the interactive contents synchronizing unit not to be synchronized with the AV contents.

15. A computer readable recording medium having embodied thereon a program which, when executed by a processor of a reproducing apparatus, causes the apparatus to perform a method of synchronizing interactive contents, the method comprising:
receiving contents including interactive contents and audio visual (AV) contents from one of a storage medium and a distributed network;
parsing and interpreting the interactive contents, and determining whether multimedia elements included in the interactive contents are synchronized with audio visual (AV) contents; and
transmitting an application program interface (API) corresponding to an interactive control command to an AV contents reproducing engine that reproduces the AV contents and a synchronized multimedia element reproducing engine that reproduces the multimedia elements that are determined to be synchronized with the AV contents, such that the multimedia elements are synchronized and mixed with the AV contents for a visual display on a screen of a display device.

16. A computer readable recording medium having embodied thereon a program which, when executed by a processor of a reproducing apparatus, causes the apparatus to perform a method of synchronizing and reproducing interactive contents, the method comprising:
receiving AV/interactive contents including interactive contents and audio visual (AV) contents from a storage medium and/or a distributed network;
determining whether multimedia elements included in the interactive contents are synchronized with the AV contents and transmitting an application program interface (API) corresponding an interactive control command;
receiving the transmitted API and reproducing the AV contents, via an AV contents reproducing engine, according to the received API; and receiving the transmitted API and reproducing multimedia elements, via a synchronized multimedia reproducing engine, that are determined to be synchronized with the AV contents, such that the multimedia elements are synchronized and mixed with the AV contents for a visual display on a screen of a display device.

* * * * *

UNITED STATES PATENT AND TRADEMARK OFFICE
CERTIFICATE OF CORRECTION

PATENT NO. : 7,401,100 B2  Page 1 of 1
APPLICATION NO. : 10/798272
DATED : July 15, 2008
INVENTOR(S) : Kil-soo Jung et al.

It is certified that error appears in the above-identified patent and that said Letters Patent is hereby corrected as shown below:

Column 10, line 48, change "Input" to --input--.

Column 10, line 52, change "element" to --elements--.

Column 11, line 15, change "end" to --and--.

Column 12, line 23, change "content" to --contents--.

Signed and Sealed this

Ninth Day of September, 2008

JON W. DUDAS
*Director of the United States Patent and Trademark Office*